US010479303B2

(12) United States Patent
Koehler et al.

(10) Patent No.: US 10,479,303 B2
(45) Date of Patent: Nov. 19, 2019

(54) SAFETY SYSTEM FOR A VEHICLE OF A VEHICLE FLEET

(71) Applicant: Robert Bosch GmbH, Stuttgart (DE)

(72) Inventors: Armin Koehler, Sachsenheim (DE); Heiko Freienstein, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 15/527,408

(22) PCT Filed: Dec. 17, 2015

(86) PCT No.: PCT/EP2015/080186
§ 371 (c)(1),
(2) Date: May 17, 2017

(87) PCT Pub. No.: WO2016/097121
PCT Pub. Date: Jun. 23, 2016

(65) Prior Publication Data
US 2017/0349127 A1 Dec. 7, 2017

(30) Foreign Application Priority Data
Dec. 18, 2014 (DE) .......................... 10 2014 226 420

(51) Int. Cl.
*B60R 21/0134* (2006.01)
*B60W 30/085* (2012.01)
(Continued)

(52) U.S. Cl.
CPC ...... *B60R 21/0134* (2013.01); *B60R 21/0173* (2013.01); *B60W 30/085* (2013.01);
(Continued)

(58) Field of Classification Search
CPC . B60R 21/013; B60R 21/0134; B60R 21/036; B60R 21/0173; B60W 30/085
See application file for complete search history.

(56) References Cited

U.S. PATENT DOCUMENTS 8,463,500 B2 * 6/2013 Cuddihy ............. B60R 21/0132
280/735
8,639,437 B2 * 1/2014 Caminiti ................ G08G 1/163
180/275
(Continued)

FOREIGN PATENT DOCUMENTS

EP 1705624 A1 9/2006
EP 2189811 A1 5/2010
(Continued)

OTHER PUBLICATIONS

International Search Report dated Mar. 21, 2016, issued in the underlying International Application PCT/EP2015/080186 filed Dec. 17, 2015.

*Primary Examiner* — Faye M Fleming
(74) *Attorney, Agent, or Firm* — Norton Rose Fulbright US LLP; Gerard Messina

(57) ABSTRACT

A pre-crash system has at least one dummy actuator and an adaptive pre-trigger function that is implemented with different parameter sets as a function of a current degree of validation, and evaluates the acquired physical quantities for pre-crash recognition in order to recognize an unavoidable crash, a first parameter set, which limits the pre-trigger function to a dummy operating mode in which the pre-trigger function produces at least one trigger signal for the dummy actuator if the evaluation of the physical quantities permits the inference of an unavoidable crash, being implemented until the current degree of validation satisfies a specified condition, the pre-trigger function comparing the triggering of the dummy actuator with the behavior of the evaluation and control unit, and, as a function of the comparison, rating the triggering of the dummy actuator as "correct" or as a "false positive."

11 Claims, 1 Drawing Sheet

(51) Int. Cl.
  *B60R 21/013* (2006.01)
  *B60R 21/017* (2006.01)
  *G08G 1/16* (2006.01)
  *G07C 5/00* (2006.01)
  *G07C 5/08* (2006.01)
  *B60R 21/0136* (2006.01)
  *G01S 13/93* (2006.01)
  *G01S 17/93* (2006.01)

(52) U.S. Cl.
  CPC ............ *G07C 5/008* (2013.01); *G07C 5/085* (2013.01); *G08G 1/164* (2013.01); *G08G 1/166* (2013.01); *B60R 21/013* (2013.01); *B60R 21/0136* (2013.01); *G01S 13/93* (2013.01); *G01S 17/93* (2013.01)

(56) References Cited

U.S. PATENT DOCUMENTS

| | | | |
|---|---|---|---|
| 8,965,676 B2* | 2/2015 | Hafner | G08G 1/163 340/907 |
| 9,108,582 B1* | 8/2015 | Kozloski | B60R 21/0132 |
| 9,663,052 B2* | 5/2017 | Rao | B60R 21/0134 |
| 2006/0095175 A1 | 5/2006 | deWaal et al. | |
| 2008/0167781 A1 | 7/2008 | Labuhn et al. | |
| 2013/0158809 A1* | 6/2013 | Yopp | B60R 21/0134 701/45 |
| 2018/0122237 A1* | 5/2018 | Nascimento | G08G 1/096827 |

FOREIGN PATENT DOCUMENTS

| | | |
|---|---|---|
| EP | 2492152 A1 | 8/2012 |
| EP | 2610103 A1 | 7/2013 |
| JP | 2006193098 A | 7/2006 |
| WO | 2010142380 A1 | 12/2010 |

* cited by examiner

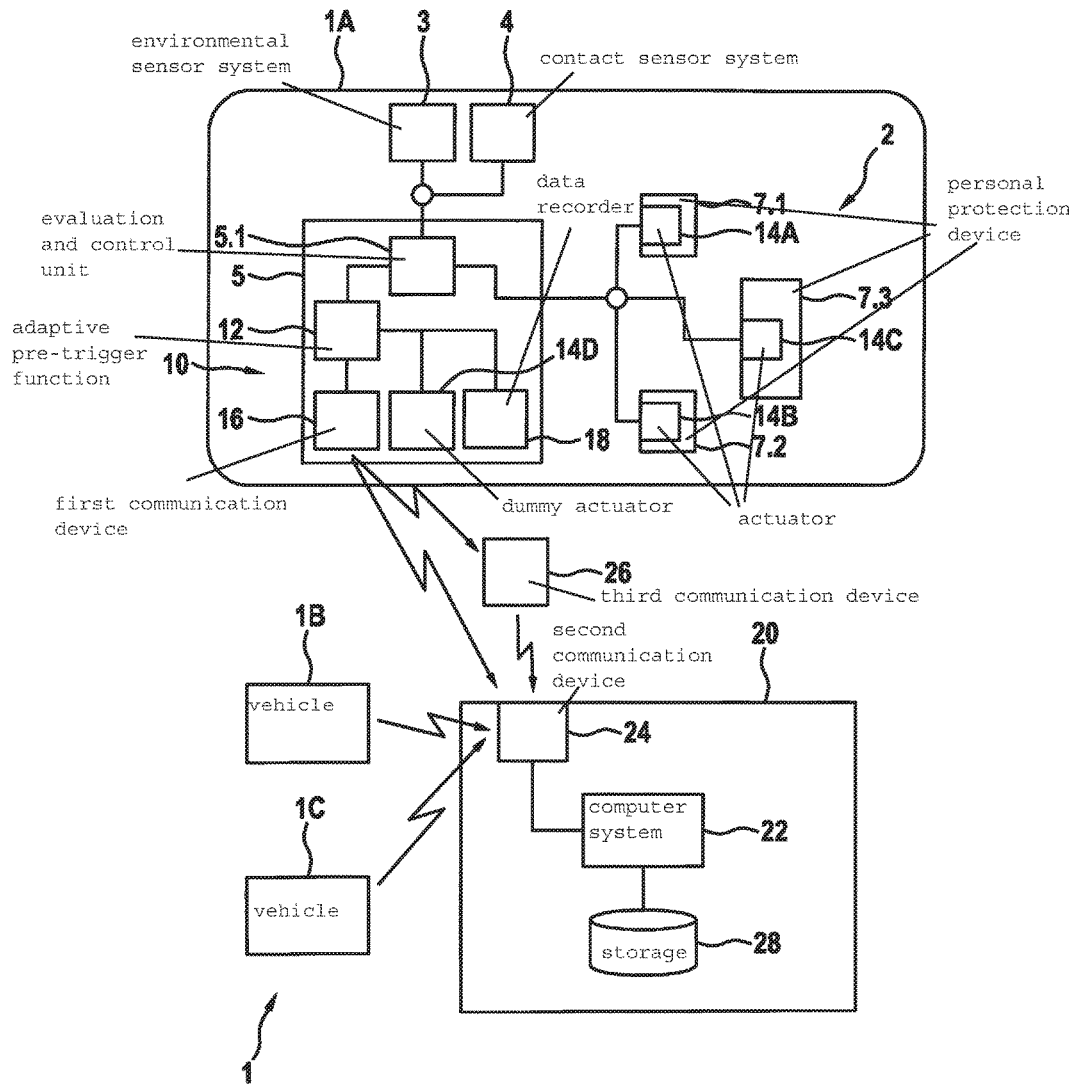

SAFETY SYSTEM FOR A VEHICLE OF A VEHICLE FLEET

FIELD

The present invention is based on a safety system for a vehicle of a fleet of vehicles, and on a corresponding system for validating a pre-trigger function for safety systems in vehicles of a fleet of vehicles.

BACKGROUND INFORMATION

Irreversible actuators of personal protection devices for passive safety systems in vehicles, such as pyrotechnic safety belts and airbags, are today generally triggered on the basis of a contact sensor system. Reversible actuators of personal protection devices, such as electromotoric safety belts, are today triggered already in a pre-crash phase, on the basis of an environmental sensor system such as radar, video, or amalgamated systems. The triggering of the irreversible actuators requires a very high degree of robustness. This is a result of the high safety demands regarding "false triggerings" (false positives) based on the assessment of risk, and of the very low degree of acceptance of false positives, because even apart from the safety risk, false positives require repair, which is costly and exasperating.

A timely recognition of an unavoidable collision required for the irreversible triggering of pyrotechnic actuators in the pre-trigger region of approximately 80 to 40 ms before impact can be realized for many crash situations using today's environmental sensor systems. The basis for this is provided by conventional pre-crash functions and automatic emergency braking functions.

However, these conventional systems are for example designed such that adequate validation performance for avoiding false interventions or false positives requires a standard of less than one time over the life of the vehicle. For pre-trigger functions, a much higher robustness requirement against false positives is indicated, which is at least three orders of magnitude below the current degree of validation for false interventions or false positives.

In conventional so-called black box validation, driving in the field takes place with a prototype system for so many hours that the corresponding degree of robustness can be reliably set when no false positive has occurred in this time span. If the required robustness is for example less than $10^{-5}$ errors/operating hour, then driving takes place in the field with the prototype system for $10^5$ operating hours. For mass production, this cannot be done for the required order of magnitude of the pre-triggering function.

SUMMARY

An example safety system according to the present invention for a vehicle of a vehicle fleet, and an example system according to the present invention for validating a pre-trigger function for safety systems in vehicles of a vehicle fleet may have the advantage that both software components or parameters of the algorithm for crash recognition, and also software components or parameters of the pre-crush function for controlling actuators in the case of a recognized or impending crash, can be activated retroactively, i.e., after installation. Here, the software components for crash recognition basically become active but are evaluated with different parameters using dummy actuators until a specified degree of robustness can be ascertained. When this is the case, the algorithms, with optimal parameterization, are released for intervention with respect to the real actuators.

In the exemplary embodiments of the present invention, algorithms that pursue the goal of recognizing an unavoidable crash are based on the same basic idea, but are differently realized, or parameterized, as a function of required recognition rate, recognition time, and robustness. Thus, given a low degree of validation, the first parameter set enables only uncritical interventions with reversible measures, or interventions with a greater limitation of the field of action, in order to provide a high degree of robustness even when there is a low degree of validation. Given a high degree of validation, the second parameter set enables the activation of interventions having a higher safety risk, or of irreversible measures and interventions with a broader field of action, because these are made secure by the high degree of validation.

Specific embodiments of the present invention provide a safety system for a vehicle of a vehicle fleet having a personal protection device, a contact sensor system for acquiring at least one physical quantity relevant to an impact, a pre-crash system that includes an environmental sensor system for acquiring at least one physical quantity relevant to a crash in the environment of the vehicle, and an evaluation and control unit, which evaluates the physical quantities acquired by the contact sensor system and by the environmental sensor system for impact recognition and for pre-crash recognition, and, as a function of the evaluation and of specified parameters, controls at least one actuator of the personal protection device. According to the present invention, the pre-crash system has at least one dummy actuator and an adaptive pre-trigger function that is implemented with different parameter sets as a function of the current degree of validation, and that evaluates the acquired physical quantities for pre-crash recognition in order to recognize an unavoidable crash, a first parameter set, which limits the pre-trigger function to a dummy operating mode in which the pre-trigger function produces at least one trigger signal for the dummy actuator if the evaluation of the physical quantities permits the inference of an unavoidable crash, being implemented until the current degree of validation satisfies a specified condition, the pre-trigger function comparing the triggering of the dummy actuator with the behavior of the evaluation and control unit, and, as a function of the comparison, rating the triggering of the dummy actuator as "correct" or as a "false positive."

In the automatic comparison, the triggering that takes place of the dummy actuator is compared for example to the signals of the contact sensor system (inertial sensor system) present in the vehicle. If, after a pre-crash triggering of the dummy actuator by the pre-trigger function, the contact or inertial sensor system has measured an acceleration impulse that has for example caused the evaluation and control unit to trigger a safety belt, this triggering can then be stored as "correct" or as a "true positive" event. If such an acceleration impulse is not present, then a "false triggering" or "false positive" event has occurred, which is stored.

In addition, a system for validating a pre-trigger function for safety systems according to the present invention in vehicles of a vehicle fleet is proposed that includes a central unit having a computer system, a second communication device, and storage device. Here, the computer system communicates with the vehicles of the fleet via the second communication device, and exchanges data with the vehicles. The computer system of the central unit receives the ratings of triggerings of the dummy actuators and/or the sum of the operating hours of vehicles of the vehicle fleet.

The computer system stores this information in the storage device. In addition, the computer system evaluates this information in order to calculate the current degree of validation of the pre-trigger function, and to check the first parameter set.

Through the measures and developments described herein, advantageous improvements are possible of the safety system described herein for a vehicle of a fleet and of the system described herein for validating a pre-trigger function for safety systems in vehicles of a fleet.

It is particularly advantageous that the pre-trigger function can include a data recorder that stores the ratings of the triggering of the dummy actuator and sums the operating hours.

In an advantageous embodiment of the safety system according to the present invention, the pre-trigger function can include a first communication device via which the rating of the triggering of the dummy actuator and/or the sum of the operating hours can be transmitted to a central unit. In addition, the first communication device can receive an updated first parameter set or a second parameter set from the central unit and can provide it to the pre-trigger function. Here, the second parameter set enables an operation of the pre-trigger function in accordance with its intended functioning, in which the pre-trigger function produces triggering signals for the at least one actuator of the personal protection device.

In an advantageous embodiment of the system according to the present invention, as needed the computer system can ascertain the number of "false positives" of the dummy actuators in vehicles of the vehicle fleet, and can ascertain the sum of the operating hours of these vehicles of the fleet, and calculates the current degree of validation of the pre-trigger function as the number of "false positives" of the dummy actuators in the vehicles for a time unit. The computer system can compare the calculated current degree of validation of the pre-trigger function with a specified threshold value that represents a required degree of robustness of the pre-trigger function. Here, the computer system can output the second parameter set to vehicles of the vehicle fleet when the number of "false positives" of the dummy actuators in the vehicles for a time unit is below the specified threshold value.

In a further advantageous embodiment of the system according to the present invention, the computer system can communicate with the first communication devices of the vehicles of the vehicle fleet via the second communication device directly, or via a third communication device. The third communication device can for example be located in a workshop and can read out the data recorder of the pre-trigger function via the first communication device during a diagnosis. The communication devices are preferably realized as IP (Internet protocol) nodes. The authorization or parameterization of software components of the pre-trigger function takes place for example via a wireless radio connection with an IP node in the respective vehicle of the vehicle fleet and a download function that can be authorized and that is protected. Alternatively, the authorization or parameterization of software components of the pre-trigger function can take place via a diagnostic tool in the workshop, for example during regular service sessions or facelifts. The reading out of the data collected in the vehicles of the fleet can for example also take place via a wireless radio connection with IP nodes in the respective vehicle of the fleet, or via the diagnostic interface when in the workshop. In addition, the individual vehicles can transmit the collected data periodically or after a triggering of the dummy actuator via a radio connection to a cloud or to a server in the central unit. The central unit can for example be set up by the vehicle manufacturer, a supplier, or a service provider that can continuously evaluate the collected data. Because the authorization or parameterization of software components of the pre-trigger function is an activation of safety-critical functions, the activation takes place in protected fashion and only via an authorized agent, regardless of the form in which it takes place.

An exemplary embodiment of the present invention is shown in the FIGURE and is explained in more detail below. In the FIGURE, identical reference characters designate components or elements that perform the same or analogous functions.

BRIEF DESCRIPTION OF THE DRAWING

FIG. 1 shows a schematic block diagram of a system for validating a pre-trigger function for safety systems in vehicles of a vehicle fleet, with an exemplary embodiment of the safety system according to the present invention for a vehicle of a vehicle fleet.

DETAILED DESCRIPTION OF EXAMPLE EMBODIMENTS

As can be seen in FIG. 1, a vehicle fleet 1 comprises a plurality of vehicles of which three vehicles 1A, 1B, 1C are shown as examples. Each of these vehicles 1A, 1B, 1C has a safety system 2 that is shown in more detail in a first vehicle 1A of vehicle fleet 1.

As is further visible in FIG. 1, safety system 2 includes personal protection devices 7, a contact sensor system 4 for acquiring at least one physical quantity relevant to impacts, a pre-crash system 10 that includes an environmental sensor system 3 for acquiring at least one crash-relevant physical quantity in the environment surrounding the vehicle, and an evaluation and control unit 5.1 that evaluates the physical quantities acquired by contact sensor system 4 and by environmental sensor system 3 for impact recognition and for pre-crash recognition, and, as a function of the evaluation and of specified parameters, controls at least one actuator 14A, 14B, 14C of personal protection devices 7. According to the present invention, pre-crash system 10 has at least one dummy actuator 14D and an adaptive pre-trigger function 12 that is implemented with different parameter sets as a function of the current degree of validation, and that evaluates the acquired physical quantities for pre-crash recognition in order to recognize an unavoidable crash, a first parameter set, which limits pre-trigger function 12 to a dummy operating mode in which pre-trigger function 12 produces at least one triggering signal for dummy actuator 14D if the evaluation of the physical quantities permits the inference that a crash is unavoidable, being implemented until the current degree of validation satisfies a specified condition, pre-trigger function 12 comparing the triggering of dummy actuator 14D with the behavior of evaluation and control unit 5.1, and, as a function of the comparison, rating the triggering of dummy actuator 14D as "correct" or as a "false positive." In the depicted exemplary embodiment, in the dummy operation enabled by the first parameter set, given a low degree of validation for example only uncritical interventions with reversible measures or interventions with a stronger limitation of the field of action are possible, in order in this way to provide a high degree of robustness of safety system 2 even when there is a low degree of validation.

In the depicted exemplary embodiment, pre-trigger function 12 includes a data recorder 18 that stores the rating of the triggering of dummy actuator 14D and that sums the operating hours, and a first communication device 16 via which the rating of the triggering of dummy actuator 14D and/or the sum of the operating hours can be transmitted to a central unit 20. In addition, first communication device 16 receives an updated first parameter set or a second parameter set from central unit 20, and provides it to pre-trigger function 12. The second parameter set enables operation of pre-trigger function 12 in accordance with its intended function, in which pre-trigger function 12 produces triggering signals for the at least one actuator 14A, 14B, 14C of personal protection devices 7.

As is also visible in FIG. 1, personal protection devices 7 include reversible restraint devices 7.1 such as electromotoric safety belts or active engine hoods that are triggered by a first actuator 14A, irreversible restraint devices 7.2, such as interior and/or exterior airbags, triggered by a second pyrotechnic actuator 14B, and adaptive crash structures 7.3 triggered by a third actuator 14C. In addition, actuators can be provided that carry out active interventions in the vehicle brake system, steering, chassis, and/or suspension system, and/or that produce an additional braking effect.

Environmental sensor system 3 includes for example radar, video, ultrasound, or lidar systems for acquiring the crash-relevant physical quantities in the environment surrounding the vehicle. Contact sensor system 4 includes for example pressure and/or acceleration sensors for acquiring the impact-relevant physical quantities. Evaluation and control unit 5.1 and the components of pre-crash system 10 are implemented in a common control device 5 in the depicted exemplary embodiment. In addition, evaluation and control unit 5.1 and pre-trigger function 12 can combine arbitrary data from sensor information from environmental sensor system 3 and from contact sensor system 4 in order to recognize an impending impact. Thus, for example using an intelligent data fusion of at least two physically redundant sensor signals from environmental sensor system 3, such as radar signals, that are suitable for location and speed measurements, and video signals that are suitable for object classification, an adequately good and reliable pre-crash recognition can be provided. However, even if such an estimation shows this possibility of pre-crash recognition, the requirement of secure validation of safety system 2 according to the present invention against undesired false positives remains.

Therefore, the depicted system for validating a pre-trigger function 12 for safety systems 2 in vehicles 1A, 1B, 1C of a fleet of vehicles 1 includes a central unit 20 that includes a computer system 22, a second communication device 24, and storage device 28. Computer system 22 communicates with vehicles 1A, 1B, 1C of vehicle fleet 1 via second communication device 24, and exchanges data with vehicles 1A, 1B, 1C of vehicle fleet 1. Computer system 22 receives the ratings of triggerings of dummy actuators 14D and/or the sum of the operating hours of vehicles 1A, 1B, 1C of vehicle fleet 1, stores these data in storage device 28, and evaluates these data in order to calculate the current degree of validation of pre-trigger function 12 and to check the first parameter set.

Computer system 22 ascertains as needed the number of "false positives" of dummy actuators 14D in vehicles 1A, 1B, 1C of vehicle fleet 1, and the sum of the operating hours of these vehicles 1A, 1B, 1C of vehicle fleet 1, and calculates the current degree of validation of pre-trigger function 12 as the number of "false positives" of dummy actuators 14D in vehicles 1A, 1B, 1C of vehicle fleet 1 for a time unit. Computer system 22 compares the calculated current degree of validation of pre-trigger function 12 with a specified threshold value that represents a required degree of robustness of pre-trigger function 12. Here, computer system 22 outputs the second parameter set to vehicles 1A, 1B, 1C of vehicle fleet 1 if the number of "false positives" of dummy actuators 14D in vehicles 1A, 1B, 1C is below the specified threshold value for a time unit. Given a high degree of validation, the second parameter set enables the activation of interventions with a higher safety risk, or of irreversible measures and interventions with a broader field of action, because these are made secure by the high degree of validation.

As can also be seen in FIG. 1, computer system 22 can communicate with first communication devices 16 of vehicles 1A, 1B, 1C of vehicle fleet 1 via second communication device 24 directly or via a third communication device 26. Third communication device 26 can be situated for example in a workshop, and can read out data recorder 18 of pre-trigger function 12 via first communication device 16 during a diagnosis.

In the depicted exemplary embodiment, communication devices 16, 24, 26 are each realized as IP nodes. This advantageously enables the authorization or parameterization of software components of pre-trigger function 12 through a corresponding communication connection between second communication device 24 or third communication device 26 with first communication device 16 in vehicle 1A, 1B, 1C with an authorized and protected download function. In this way, the parameter sets can be transmitted from central unit 20, for example directly via second communication connection 24 to first communication device 16, or indirectly via second communication connection 24 and third communication connection 26 to first communication device 16. In addition, the data can be exchanged between central unit 20 and vehicles 1A, 1B, 1C of vehicle fleet 1 via a cloud. Because this is an activation of safety-critical functions, the data transmission takes place in protected fashion and only through an authorized agent, regardless of the form in which it takes place. Central unit 20 can for example be set up by the vehicle manufacturer, a supplier, or a service provider that can continuously evaluate the collected data.

What is claimed is:

1. A safety system for a vehicle of a fleet of vehicles, comprising:
    a personal protection device;
    a contact sensor system for acquiring at least one impact-relevant physical quantity;
    an environmental sensor system for acquiring at least one crash-relevant physical quantity in an environment surrounding the vehicle; and
    an evaluation and control unit;
    wherein:
        the evaluation and control unit is configured to:
            evaluate the at least one impact-relevant physical quantity acquired by the contact sensor system;
            execute an adaptive pre-trigger function by which to:
                evaluate the at least one crash-relevant physical quantity acquired by the environmental sensor system;
                based on the evaluation of the at least one crash-relevant physical quantity acquired by the environmental sensor system, recognize that an unavoidable crash, which has not yet occurred, will occur; and based on the recognition that the unavoidable crash will occur and only when the adaptive pre-trigger function is validated to be accurate, output a trigger signal that triggers deployment of the personal protection device prior to occurrence of the unavoidable crash; and determine, for respective recognitions that the unavoidable crash will occur, whether a respective corresponding crash impact is recognized subsequent to the respective recognition that the unavoidable crash will occur, with a result of the determination impacting a rating indicating whether there is a threshold correspondence between the recognitions that the unavoidable crash will occur and the recognitions of crash impact; and the adaptive pre-trigger function:
is initially installed without being validated to be accurate, prior to the rating indicating that there is the threshold correspondence, so that one or more recognitions that the unavoidable crash will occur is made by the execution of the adaptive pre-trigger function without the trigger signal being output to trigger the deployment of the personal protection device; and is subsequently updated to be validated to be accurate in response to the rating being changed to indicate that there is the threshold correspondence so that in response to a subsequent recognition that the unavoidable crash will occur, the adaptive pre-trigger function causes deployment of the personal protection device prior to any corresponding crash impact being determined.

2. The safety system as recited in claim 1, further comprising a data recorder that stores the rating and sums operating hours.

3. The safety system as recited in claim 1, further comprising a first communication device via which the safety system is configured to transmit at least one of the rating and a sum of operating hours to a central unit.

4. The safety system as recited in claim 3, wherein the first communication device receives an update from the central unit by which the adaptive pre-trigger function is validated to be accurate, thereby enabling the output of the trigger signal that triggers the deployment of the personal protection device in response to the recognition that the unavoidable crash will occur.

5. A system for validating a pre-trigger function for a safety system in vehicles of a fleet of vehicles, comprising:
a central unit that includes a computer system, a first communication device, and storage device, the computer system communicating with and exchanging data with the vehicles of the vehicle fleet via the first communication device;

wherein:
the safety system of the individual vehicles of the vehicle fleet includes:
a personal protection device;
a contact sensor system for acquiring at least one impact-relevant physical quantity;
an environmental sensor system for acquiring at least one crash-relevant physical quantity in an environment surrounding the vehicle; and
an evaluation and control unit;
the evaluation and control unit is configured to:
evaluate the at least one impact-relevant physical quantity acquired by the contact sensor system;

execute an adaptive pre-trigger function by which to:
evaluate the at least one crash-relevant physical quantity acquired by the environmental sensor system;
based on the evaluation of the at least one crash-relevant physical quantity acquired by the environmental sensor system, recognize that an unavoidable crash, which has not yet occurred, will occur; and
based on the recognition that the unavoidable crash will occur and only when the adaptive pre-trigger function is validated to be accurate, output a trigger signal that triggers deployment of the personal protection device prior to occurrence of the unavoidable crash; and determine, for respective recognitions that the unavoidable crash will occur, whether a respective corresponding crash impact is recognized subsequent to the respective recognition that the unavoidable crash will occur, with a result of the determination impacting a respective rating of correspondence in the respective vehicle between the recognitions that the unavoidable crash will occur and the recognitions of crash impact, by which a determination is made of whether there is a threshold correspondence between the recognitions that the unavoidable crash will occur and the recognitions of crash impact;

the adaptive pre-trigger function:
is initially installed without being validated to be accurate, prior to the rating indicating that there is the threshold correspondence, so that one or more recognitions that the unavoidable crash will occur is made by the execution of the adaptive pre-trigger function without the trigger signal being output to trigger the deployment of the personal protection device; and is subsequently updated to be validated to be accurate in response to the rating being changed to indicate that there is the threshold correspondence; and the computer system:
receives data including one or both of (a) the respective ratings and (b) respective sums of operating hours of the adaptive pre-trigger function in the respective vehicles of the vehicle fleet;
stores the data in the storage device;
evaluates the data to determine whether the threshold correspondence is met; and
in response to determining that the threshold correspondence is met, transmits, to the vehicles of the vehicle fleet and via the first communication device, an update by which the adaptive pre-trigger function in the vehicles of the vehicle fleet is validated to be accurate, so that in response to a subsequent recognition that the unavoidable crash will occur, the adaptive pre-trigger function causes deployment of the personal protection device prior to any corresponding crash impact being determined.

6. The system as recited in claim 5, wherein the computer system:
ascertains a number of "false positives" of in which the execution of the adaptive pre-trigger function in the vehicles of the vehicle fleet resulted in a recognition that the unavoidable crash will occur without a corresponding impact recognition;

ascertains a sum of the operating hours of the vehicles of the vehicle fleet; and calculates a current correspondence between the recognitions that the unavoidable crash will occur and the recognitions of impact as the number of "false positives" per unit of time.

7. The system as recited in claim 6, wherein the computer system determines whether the calculated current correspondence meets the threshold correspondence so that the update is transmitted when the number of "false positives" per unit of time is below a predefined threshold value.

8. The system as recited in claim 5, wherein the computer system communicates with second communication devices of the vehicles of the vehicle fleet via the first communication device directly or indirectly via a third communication device.

9. The system as recited in claim 8, wherein the third communication device is situated in a workshop and reads out respective data recorders of the vehicles of the vehicle fleet via the respective second communication devices during respective diagnoses.

10. The system as recited in claim 9, wherein the communication devices are IP nodes.

11. The safety system as recited in claim 1, wherein, in response to the recognition that the unavoidable crash will occur prior to the validation of the adaptive pre-trigger function, the evaluation and control unit executing the adaptive pre-trigger function is configured to provide the trigger signal to a device that does not react to produce any output.

* * * * *